(12) United States Patent
Nielsen et al.

(10) Patent No.: US 10,170,226 B2
(45) Date of Patent: Jan. 1, 2019

(54) SPOOL ARRANGEMENT

(71) Applicant: DANFOSS A/S, Nordborg (DK)

(72) Inventors: Claus Cornett Nielsen; Kristian Melgaard Jørgensen, Kolding (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/503,040

(22) PCT Filed: Jun. 23, 2015

(86) PCT No.: PCT/EP2015/064139
§ 371 (c)(1),
(2) Date: Feb. 10, 2017

(87) PCT Pub. No.: WO2016/034299
PCT Pub. Date: Mar. 10, 2016

(65) Prior Publication Data
US 2017/0236629 A1 Aug. 17, 2017

(30) Foreign Application Priority Data
Sep. 4, 2014 (EP) .................................. 14183524

(51) Int. Cl.
| | | |
|---|---|---|
| H01F 7/08 | (2006.01) |
| F16K 27/02 | (2006.01) |
| H01F 6/06 | (2006.01) |
| H01F 27/30 | (2006.01) |
| H01F 27/24 | (2006.01) |

(Continued)

(52) U.S. Cl.
CPC ........... *H01F 7/081* (2013.01); *F16K 27/029* (2013.01); *H01F 6/06* (2013.01); *H01F 27/24* (2013.01); *H01F 27/28* (2013.01); *H01F 27/306* (2013.01); *H01F 7/128* (2013.01); *H01F 2007/083* (2013.01)

(58) Field of Classification Search
CPC .... H01F 7/128; H01F 7/081; H01F 2007/083; F16K 27/029
See application file for complete search history.

(56) References Cited

U.S. PATENT DOCUMENTS

| 3,262,027 A | 7/1966 | Zaleske et al. |
| 3,295,079 A | 12/1966 | Brown |

(Continued)

FOREIGN PATENT DOCUMENTS

| CH | 552 884 A | 8/1974 |
| DE | 30 27 067 A1 | 2/1982 |
| GB | 1 279 509 A | 6/1972 |

(Continued)

OTHER PUBLICATIONS

International Search Report for PCT Serial No. PCT/EP2015/064139 dated Sep. 15, 2015.

*Primary Examiner* — Ramon M Barrera
(74) *Attorney, Agent, or Firm* — McCormick, Paulding & Huber LLP

(57) ABSTRACT

A spool arrangement 1 is described comprising a spool member (47) having a coil embedded in a spool housing (48) made of plastic material and protection means (2, 13, 28) comprising at least two parts together forming a receiving volume (46), said spool member (47) being located in said receiving volume. Such a spool arrangement (1) should be used in an environment in which there is a risk of explosions. To this end said parts form protective walls on all sides of said receiving volume (46).

19 Claims, 5 Drawing Sheets

(51) Int. Cl.
*H01F 27/28* (2006.01)
*H01F 7/128* (2006.01)

(56) References Cited

U.S. PATENT DOCUMENTS 4,186,363 A 1/1980 Schmidt, Jr. et al.
5,581,222 A 12/1996 Pinaud

FOREIGN PATENT DOCUMENTS

GB 1 441 544 A 7/1976
WO 02/086918 A1 10/2002

SPOOL ARRANGEMENT

CROSS-REFERENCE TO RELATED APPLICATIONS

This application is a National Stage application of International Patent Application No. PCT/EP2015/064139, filed on Jun. 23, 2015, which claims priority to European Patent Application No. 14183524.9, filed on Sep. 4, 2014, each of which is hereby incorporated by reference in its entirety.

TECHNICAL FIELD

The patent invention relates to a spool arrangement comprising a spool member having a coil embedded in a spool housing made of plastic material and protection means comprising at least two parts together forming a receiving volume, said spool member being located in said receiving volume.

BACKGROUND

Such a spool arrangement is known from U.S. Pat. No. 3,262,027 showing a solenoid structure and mounting means therefore. A magnetic yoke is associated with a tube. The tube contains an axially shiftable core. A valve member is carried at the end of said core. The magnetic yoke is used to complete a magnetic circuit through the core. It consists of two identical elements. Each element comprises a stem defining half of a curve central part of a U-shaped region. Two wings are attached to the stem and arranged into parallel spaced planes. Each wing comprises an opening. The different openings of each wing and both elements overlap. From each opening a slot extends to the edge of the respective wing. The two elements can be held together by inter-engaging of a protuberance on each wing with an opening in the adjacent wing.

It is frequently encounted that damageable parts like the spool member have to be disposed in surroundings in which they can be exposed to considerable stress. When, for example, such a spool arrangement is placed in areas where explosions can happen the spool arrangement must to some extend be able to withstand the effects of an explosion. If they can fulfill this requirement they are in compliance with European ATEX requirements for equipment being present in areas, where there is a risk for explosions. In such surroundings damageable parts have to be protected against mechanical impact. To this end, protection means are used.

SUMMARY

It is an object of the present invention to provide protective means which reliably protect the contents of its receiving volume against mechanical impact.

This object is solved with a spool arrangement described above in that said parts form protective walls on all sides of said receiving volume.

The spool member arranged in the receiving volume now is protected from all sides against mechanical impact. This does not mean that the receiving volume is hermetically closed. Small openings or gaps are allowed. Nevertheless, the protective walls form a protection in all directions. With such an embodiment the mechanical protection by the protective walls can be separated from the electrical protection by the spool housing. The size of the whole arrangement can be reduced. Another way would be to make the spool housing sufficient strong by making the plastic material sufficiently thick, which, however, makes the arrangement significantly larger than the spool arrangement according to the present solution.

In a preferred embodiment said coil is wound on a core, said core having a longitudinal axis, said axis intersecting two end faces of said spool housing, wherein said protective walls rest against said end faces only and form a gap with remaining parts of said spool housing. The spool housing is stronger in a direction parallel to the longitudinal axis of the core since the core forms stiffening means increasing the mechanical strength in a direction parallel to the longitudinal axis. Therefore, when there is an impact on protective walls resting against said end faces of the spool housing, the spool housing will not be damaged because of the increased mechanical strength. When a mechanical impact hits on another part of the protective walls, the respective protective wall can move a bit as reaction on the impact without damaging the housing. To this end the gap or the gaps are provided. The gap can be smaller in a region near the edges of the spool housing. This is acceptable because the protective wall near the edges of the spool housing can be stiffer itself so that the risk of movement is smaller.

Preferably at least part of said gap is formed by curved parts of said protective walls. A curve part gives an increased mechanical stability.

In a preferred embodiment said coil surrounds an aperture in said housing, wherein bushing means made of metal are arranged within said aperture. These bushing means can be used for two purposes. One purpose is the conduction of a magnetic field. The other purpose is the mechanical stiffening of the spool housing.

In a preferred embodiment at least one of said protective walls comprises a slot and said spool housing comprises at least one protrusion engaging in said slot. This is a simple possibility to fix the protective wall to the spool housing against a movement.

Preferably said first part of said protection means is in form of a first U-shaped encapsulation member with a first base and two first wings connected to said first base and said second part is in the form of a second U-shaped encapsulation member with a second base and two second wings connected to said second base, said first base and said second base being located on opposite sides of said spool housing and said first wings being arranged perpendicular to said second wings. In this way it is possible to cover all sides of the receiving volume with protective walls. Four of the protective walls are formed by wings of the U-shaped encapsulation members and two of these protective walls are formed by the basis of the encapsulation members.

Preferably said second wings have a rounded contour and said first base is adapted to said rounded contour. Said second wings rest against the end faces of the spool housing. The first base forms a gap with the spool member which gap is limited by the rounded contour of the first base.

Preferably said spool housing comprises a shaft extending through a base and engaging in a positive fitting manner a protective member on a side of said base opposite said spool housing. The shaft can, e.g., be used to lead though electrical connections from the spool housing out of the protective walls. The shaft also provides a wear resistant encapsulation for the electrical connections. The shaft can be structured and designed in such a way that it engages an opening in the base in a form-fit manner. The protective member is disposed outside the base.

In a further preferred embodiment said protection means comprise a third U-shaped encapsulation member having a third base and third wings connected to said third base, said third base being parallel to said second base and said third wings being parallel to said first wings. The first encapsulation member can be made with a limited mechanical strength since its wings are reinforced by the third encapsulation member. Preferably said third base comprises at least one recess on a peripheral side and the second base comprises at least one fastening opening wherein said recess at least partly overlaps the fastening opening. A fastening member can be disposed inside the fastening opening extending though said opening as well as through the recess. The second base and the third base can be attached to one another in this way. The second encapsulation member and the third encapsulation member can be reliably attached to one another. The encapsulation arrangement is hence rendered increasingly wear resistant.

Furthermore, it is preferred that said second encapsulating member comprises at least one collar covering a space between encapsulating members. This is another means of ensuring a reliable wear resistant encapsulation means or encapsulation arrangement. The collar is a stiffening means and is used to decrease a size of an opening between encapsulating members.

Preferably at least one said wings comprise stiffening means. These stiffening means can have the form of a protrusion protruding into the receiving volume. The stiffening means can also be used to define and fix the position of the spool housing in the receiving volume.

Preferably said stiffening means extend parallel to a base. In this way it can extend over the entire width of the way perpendicular to their axial direction.

In a preferred embodiment at least one wing comprises holding means, said holding means holding valve means. The spool arrangement is intended to actuate a solenoid valve. The holding means can now make sure that the corresponding valve means are held within the spool housing. The holding means serve to fix the position of one axial and of the valve means and hence the position of the valve means both relative to the spool housing as well as to the protection wall. The holding means can engage the axial end of the valve means in a form-fitting or force-fitting manner.

BRIEF DESCRIPTION OF THE DRAWINGS

Preferred embodiments of the invention will now be described in more detail with reference to the drawings, wherein.

DETAILED DESCRIPTION

Figure 1:
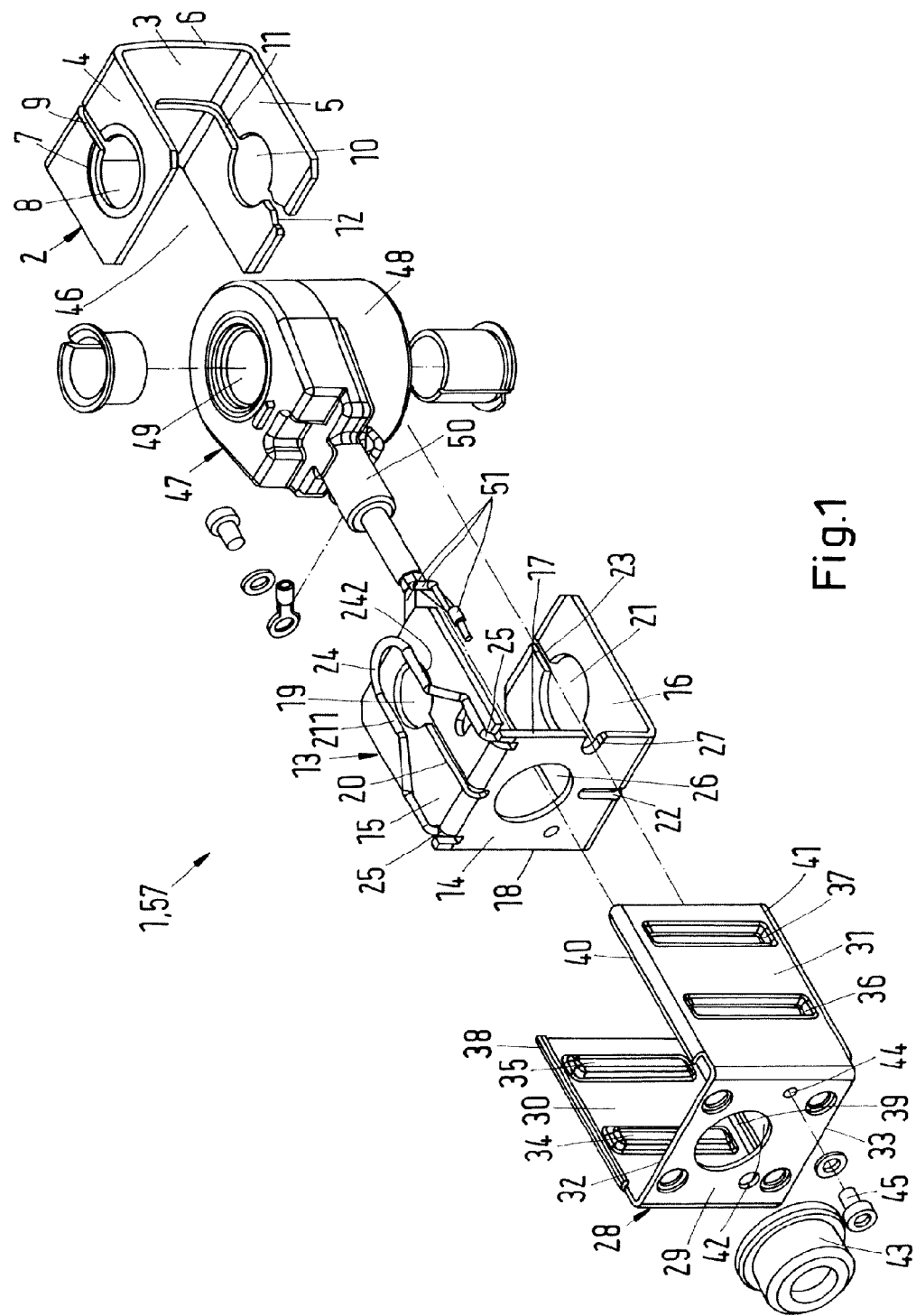
FIG. 1 is an exploded view of a spool arrangement.

FIG. 1 shows an exploded view of a spool arrangement 1. The spool arrangement 1 comprises a first encapsulation member 2 as a first part of protection means. The first encapsulation member 2 comprises a base 3 with two first wings 4, 5. The two first wings 4, 5 are arranged at the first base 3. The first encapsulation member 2 takes a U-shaped form. The first wings 4, 5 extend perpendicular from the first base 3 as parallel spaced planes. The first base 3 comprises first flanks 6, 7. The first flanks 6, 7 are arranged at a peripheral side of the first base 3 to which the wings 4, 5 are not attached.

The first base 3 has a slightly curved form, said curvature being directed outwards, i.e. not in a space between the two first wings 4, 5.

The first wings 4, 5 comprise a first opening 8, 10. Each first opening 8, 10 comprises a first slot 9, 11 extending in parallel to the axial peripheral side of the wings 4, 5 from the opening 8, 9 onto the first base 3. One of the first openings 10 also comprises a first cut 12 which is arranged in alignment with the first slot 11 of this opening 10.

The first encapsulation member 2 can be made from one piece. In this case, the first wings 4, 5 can be bend into their position comprising an angle of 90° with the first base 3 during manufacture.

The spool arrangement 1 furthermore comprises a second encapsulation member 28. The second encapsulation member 28 comprises a second base 29 with second wings 30, 31. The second wings 30, 31 are arranged at the second base 29. The second encapsulation member 28 takes an U-shaped form in the embodiment shown in FIG. 1. The second wings 30, 31 comprise an angle of 90° with the second base 29. The second base 29 furthermore comprises second flanks 32, 33. The second flanks 32, 33 are located on the peripheral sides of the second base 29 to which the second wings 30, 31 are not attached.

The second wings 30, 31 comprise protrusions 34, 35, 36, 37 extending in a direction perpendicular to the axial direction of the second wings 30, 31. The protrusions 34-37 are structured an arranged in a way that they extend over almost the entire width of the second wings 30, 31. The protrusions 34-37 are arranged in parallel and the protrusions 34, 35 on one of the second wings 30 and the protrusions 36, 37 on the other of the second wings 31 are arranged in parallel and spaced apart. They form stiffening means stiffening the second wings 30, 31.

The second wings 30, 31 furthermore comprises collars 38-41 extending in an axial direction on the peripheral side of the second wings 30, 31. The collars 38-41 extend almost over the entire axial length of the second wings 30, 31.

The second base 29 comprises a second base opening 42. A protective member 43 can be disposed on the second base 29 in such a way as to at least partially overlap with the second base opening 42. Furthermore, the second base 29 comprises a fastening opening. The protective member 43 can be in form of a metallic sleeve.

The first base 3, the first wings 4, 5, the second base 29, and the second wings 30, 31 form protective walls, when the encapsulation members 2, 28 are assembled.

The spool arrangement 1 furthermore comprises a third encapsulation member 13. The third encapsulation member 13 comprises a third base 14 with third wings 15, 16. In the embodiment shown in FIG. 1 the third encapsulation member 13 is formed in an U-shaped manner. The third wings 15, 16 comprise an angle of 90° with the third base 14. The third wings 15, 16 are arranged at the third base 14. The third base also comprises flanks 17, 18 which are located on the peripheral side of the third base 14 to which the third wings 15, 16 are not attached.

The third wings 15, 16 each comprise a third opening 19, 21. A third slot 20, 22 extends from each opening 19, 21 across the third wings 15, 16 onto the third base 14. The third slots 20, 22 run in parallel to the axial peripheral side of the third wings 15, 16. Furthermore, one of the third openings 21 comprises a third cut 23. The third cut 23 extends in alignment with the third slot 22 from the respective opening 21 to the peripheral side of the third wing 16.

Moreover, a holding member 24 is disposed on one of the third wings 15. The holding member 24 comprise a first segment 241 and a second segment 242 extending in parallel to one another and tangentially to the opening 19 on the respective wing 15. The holding member 24 can be made from one piece. The holding member 24 is attached to the third base 14 by means of a holding member attachment 25. In the embodiment shown in FIG. 1, two such holding member attachments 25 are shown. The holding member attachment 25 is located on the third base 14 in the region where the third base 14 crosses over into one of the third wings 15.

The third base 14 comprises a third base opening 26. The third base 14 also comprises a recess 27. The recess 27 is located on the third flank 17.

The third encapsulation member 13 can be made from one piece. In this case, the third wings 15, 6 can be bend into their position perpendicular to the third base 14 during manufacture. The third wings 15, 16 constitute parallel spaced planes.

The fastening opening 44 in the second base 29 at least partially overlaps with the recess 27 located on the third flank 17 of the third base 14. A fastening member 45 can be disposed within the fastening opening 44 as well as the recess 27. The fastening member 25 thus extends to the fastening opening 44 as well as well as through the recess 27.

The first encapsulation member 2, the second encapsulation member 28 and the third encapsulation member 13 define a receiving volume 46 when they are assembled. The receiving volume 26 is accordingly located between the third wings 15, 16 and the first wings 4, 5. A closure of the receiving volume 46 is established by means of the second encapsulation member 28. The second wings 30, 31 of the second encapsulation member 28 close openings which would be left within the plane defined by the first flanks 6, 7 and the third flanks 17, 18.

Within the receiving volume 46 a spool member 47 is arranged. Said spool member 47 comprises a spool housing 48. The spool housing 48 comprises an aperture 49. It moreover comprises a shaft 50. In the embodiment shown in FIG. 1 the shaft 50 extends in an axial direction relative to the axis of the second base opening 42 and the third base opening 26. The shaft 50 also contains electrical connections 51 needed to operate the spool member 47.

The first encapsulation member 2 comprises the first openings 8, 10 which overlap each other at least partially. The third encapsulation member 13 comprises the third openings 19, 21 overlapping each other at least partially. In an assemble state of the spool arrangement 1 the first openings 8, 10 and the third openings 19, 21 overlap each other at least partially. This is best seen for the first opening 8 and the third opening 19 in FIG. 2. The first openings 8, 10 and the third openings 19, 21 hence constitute a channel through the spool arrangement 1. Members of the content disposed inside the receiving volume 46 can be led through the first openings 8, 10 and the third openings 19, 21. This is best illustrated in FIG. 3.

The first encapsulation member 2 comprises the first slot 9, 10. The third encapsulation member 13 comprises the third slots 20, 22. These slots 9, 11, 20, 22 prevent eddy currents. The same is true for the cut 12, 23.

The spool housing 48 can have protrusions engaging said first slots 9, 11 and said second slots 20, 22 to fix a position of the spool member 47 within the receiving volume 46.

Figure 5:
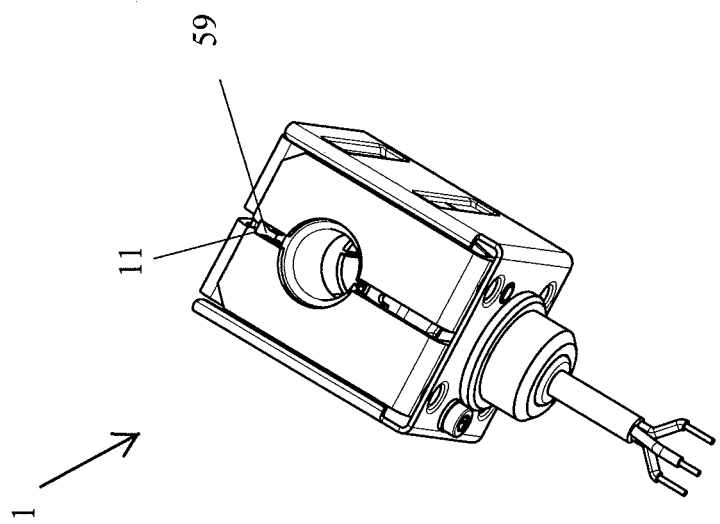
FIG. 5 is a perspective view of the spool arrangement of FIG. 1 in an assembled state.

FIG. 5 shows a protrusion 59 engaging the slot 11. Cuts 12, 17 facilitate mounting of the spool member 47 within the first encapsulation member 2 and the third encapsulation member 13.

Two bushings 57 are inserted into aperture 49. The bushings 57 are made of metal and server as magnetic field guidance. The bushings 57 are slotted to prevent the formation of eddy currents.

Figure 2:
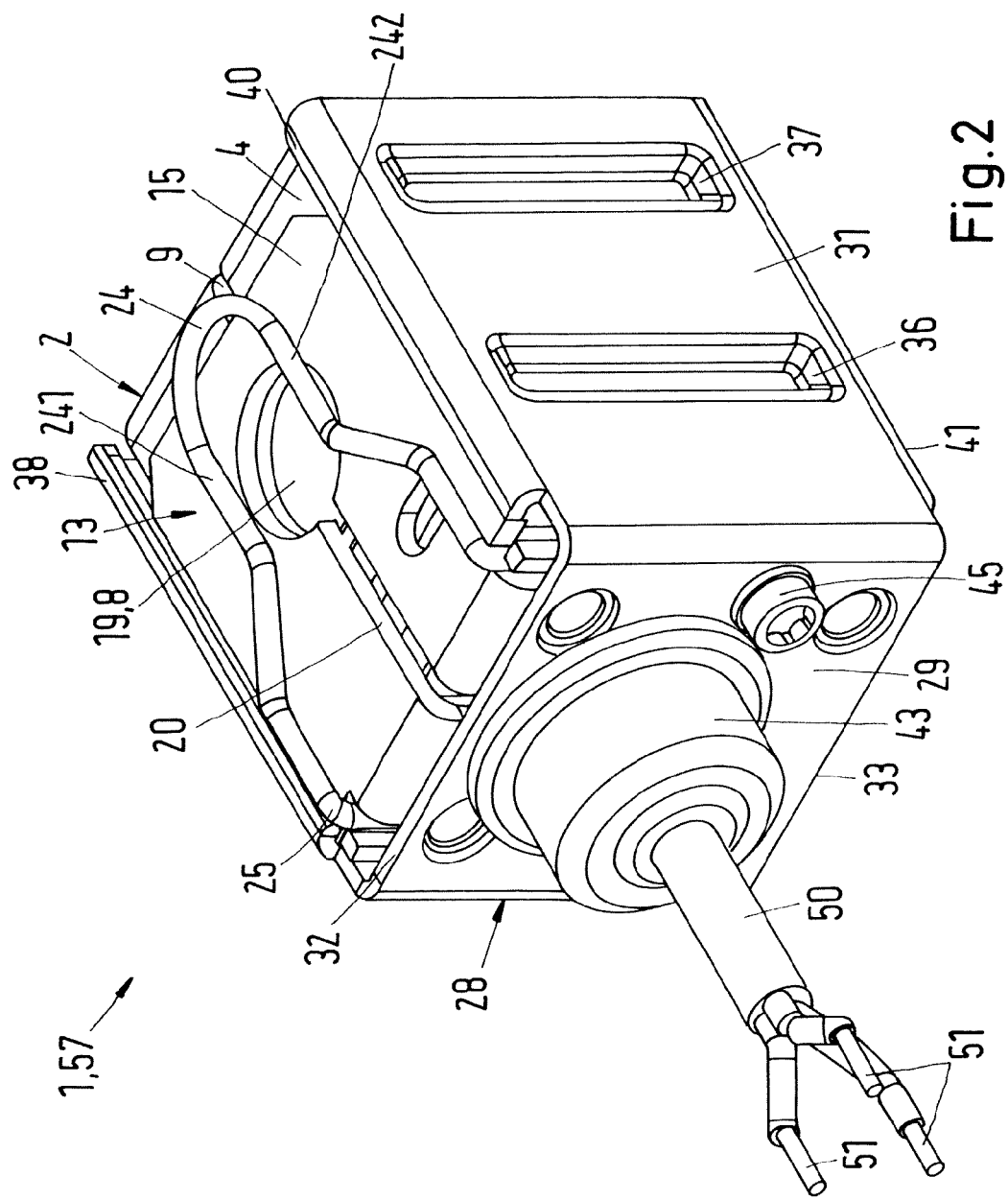
FIG. 2 is a perspective view of the spool arrangement in assembled state.
Figure 3:
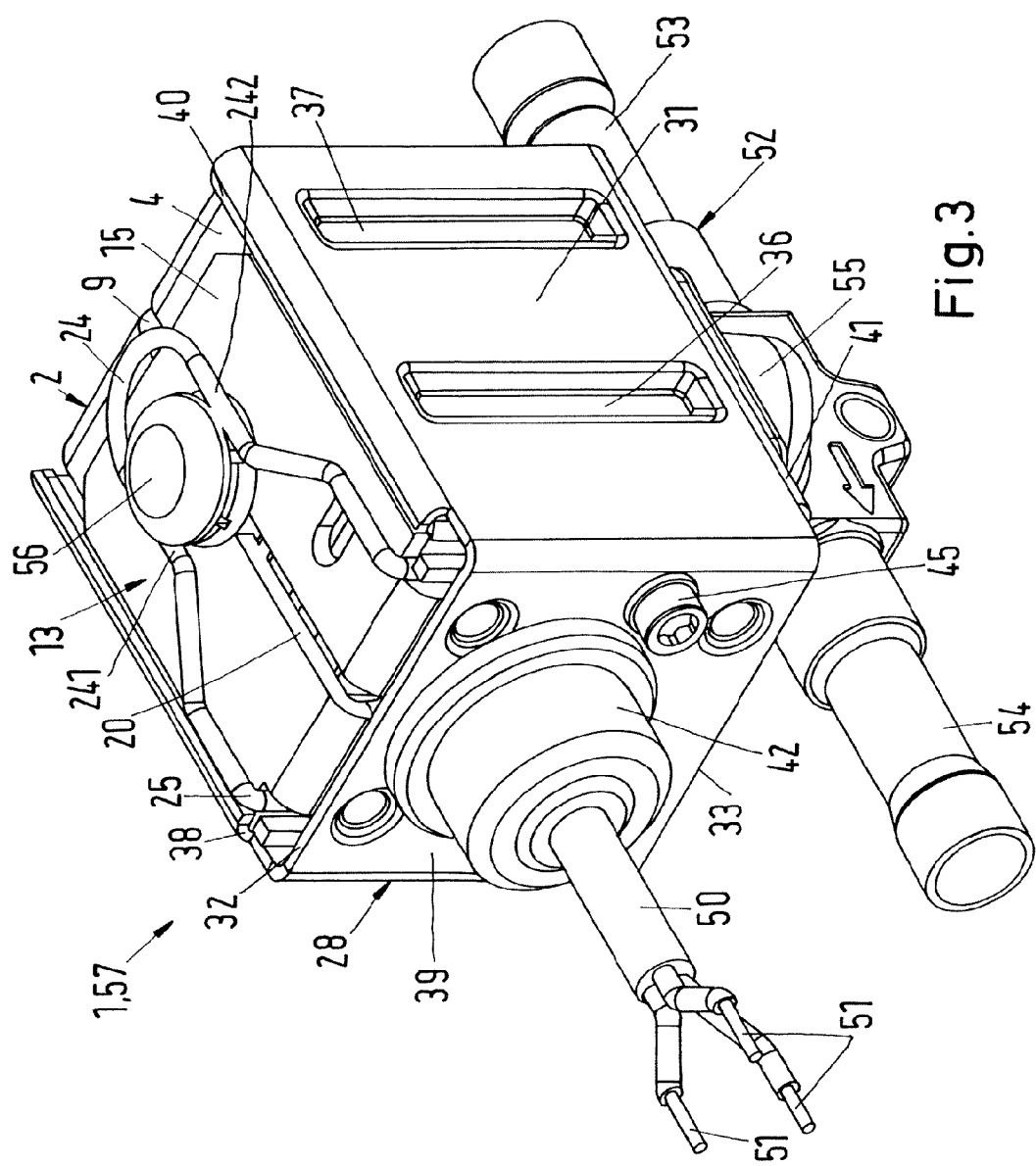
FIG. 3 is a perspective view of the spool arrangement comprising a valve means.

FIG. 2 shows the spool arrangement 1 in an assembled state. Closure of the receiving volume 46 is established. The spool member 47 is disposed within the receiving volume 46. The third opening 19, 21 and the first openings 8, 10 at least partially overlap in this embodiment. The shaft 50 of the spool member 47 is led through the second base opening 26, the third base opening 42 as well as through the protective member 43. The protective member 43 protects shaft 50 which can be formed of a hard plastic material.

The fastening member 45 can be used as external grounding or earthing.

The collars 38-41 extend over almost the entire axial length of the second wings 30, 31, respectively. The second encapsulation member 28 is securely attached to the first encapsulation member 2 and the third encapsulation member 13. The contents of the receiving volume 46 are reliably protected against mechanical impact. Very few openings are left for mechanical impact to directly reach the spool member 47.

The first encapsulation member 2 contacts the spool member 47 only with the first wings 4, 5. This contact is established on a face of the spool housing 48 through which the aperture 49 extends. The spool member 47 has a higher mechanical strength in a direction parallel to the direction of the aperture 49. This is due to the fact that a coil (not shown) is wound on a coil core through which the aperture 49 extends. The encapsulation members 2, 28, 30 form gaps with other part of the spool member 47. In case of an impact from the outside onto the spool arrangement 1, the respective wall of the encapsulation members 2, 28, 30 can be deformed slightly in a direction towards the spool member 47 thereby absorbing a great part of the impact forces.

The protective member 43 is disposed on the second base 29. It engages the shaft 50. Said engagement is established in a form-fitting manner. The protective member 43 also covers the second base opening 42 as well as the third base opening 26. The engagement of the protective member 43 with the shaft 50 of the spool member 47 may also serve to further fix the position of the spool member 47 inside the protective walls formed by the first encapsulation member 2, the second encapsulation member 28 and the third encapsulation member 13.

FIG. 3 shows the spool arrangement 1 in an assembled state which is connected with a valve 52. The spool member 47 is disposed inside the receiving volume 46. The valve member 52 comprises an inlet chamber 53 and an outlet chamber 54. A valve member 55 is disposed between the inlet chamber 53 and the outlet chamber 54. The valve member 55 extends through the aperture 49 of the spool housing 48. The valve member 55 terminates in an axial end 56.

The axial end 56 of the valve member 55 engages the first segment 241 and the second segment 242 of the holding member 24. The first segment 241 and the second segment 242 extend in parallel to one another and tangentially to the third opening 19. The axial end 56 of the valve member 55 is led through the third opening 19. The engagement between the third two segments 241, 242 and the axial end 56 of the valve member 55 hence fixes the axial end 56 to its position within the third opening 19.

Figure 4:
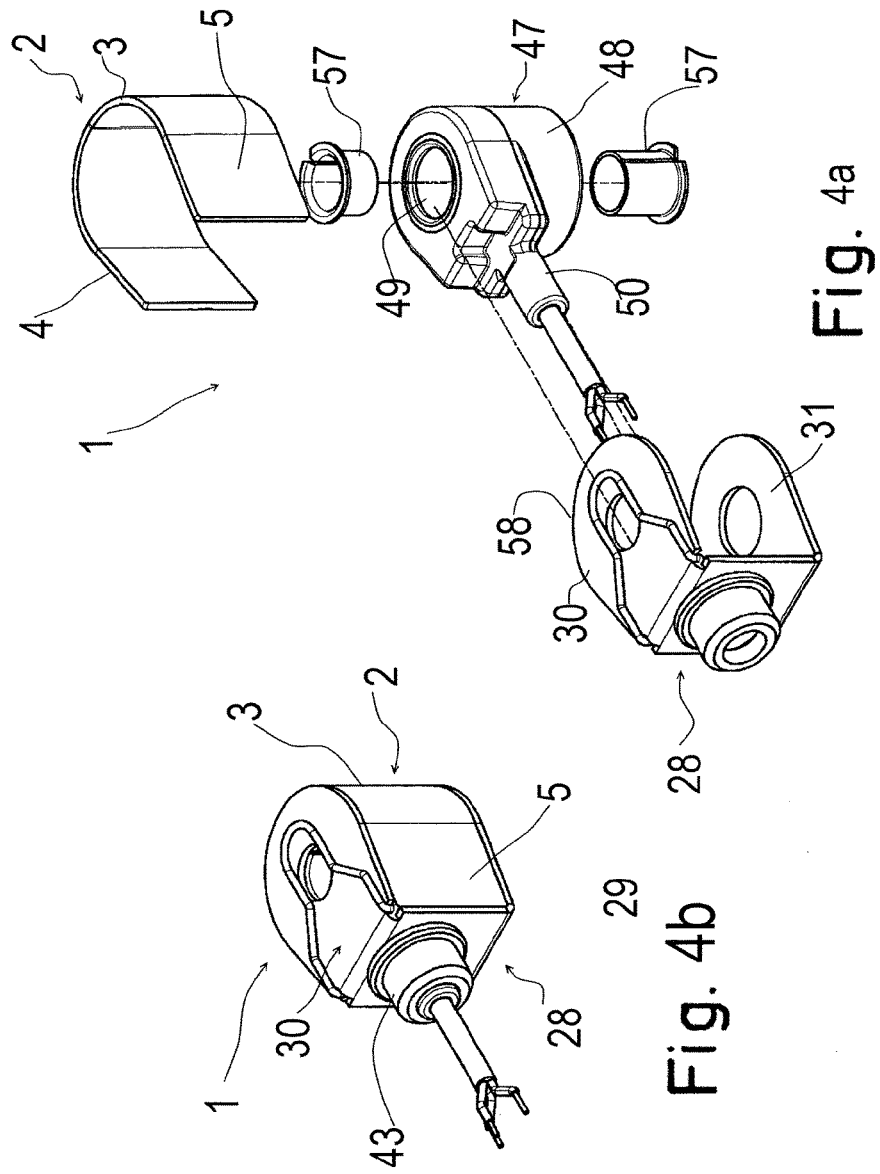
FIG. 4 shows another spool arrangement.

FIG. 4 shows a second embodiment of a spool arrangement. FIG. 4a shows an exploded view and FIG. 4b shows a spool arrangement in assembled form. Like parts as in FIGS. 1 to 3 are designated with the same reference numerals.

In this embodiment only the first encapsulation part 2 and the second encapsulation part 28 are used.

The second wings 30, 31 have a rounded contour 58. The first base 3 is adapted to this rounded contour 58, i.e. the first base 3 forms part of a circle or of an ellipse, in any case, in a mounted state the first base 3 still forms a gap with the spool housing 48.

As can be seen in FIG. 4b, the two encapsulating member 2, 28 enclose the spool member 47 completely leaving only very small openings which can be tolerated even in case the spool arrangement 1 is positioned in an area in which the risk of explosions exists, and therefore fulfill ATEX (Atmosphere Explosive) requirements.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A spool arrangement comprising a spool member having a coil embedded in a spool housing made of plastic material and protection means comprising at least two parts together forming a receiving volume, said spool member being located in said receiving volume, wherein said parts form protective walls on all sides of said receiving volume, and wherein said coil is wound on a core, said core having an longitudinal axis, said axis intersecting two end faces of said spool housing wherein said protective walls rest against said end faces only and form a gap with remaining parts of said spool housing.

2. The spool arrangement according to claim 1, wherein at least part of said gap is formed by curved parts of said protective walls.

3. The spool arrangement according to claim 1, wherein said coil surrounds an aperture in said spool housing, wherein bushing means made of metal are arranged within said aperture.

4. The spool arrangement according to claim 1, wherein at least one of said protective walls comprises a slot and said spool housing comprises at least one protrusion engaging in said slot.

5. The spool arrangement according to claim 1, wherein said first part of said protection means is in form of a first U-shaped encapsulation member with a first base and two first wings connected to said first base and said second part is in form of a second U-shaped encapsulation member with a second base and two second wings connected to said second base, said first base and said second base being located on opposite sides of said spool housing and said first wings being arranged perpendicular to said second wings.

6. The spool arrangement according to claim 5, wherein said second wing have a rounded contour and said first base is adapted to said rounded contour.

7. The spool arrangement according to claim 5, wherein said spool housing comprises a shaft extending through a base and engaging a protective member on a side of said base opposite said spool housing.

8. The spool arrangement according to claim 5, wherein said protection means comprise a third U-shaped encapsulation member having a third base and third wings connected to said third base, said third base being parallel to said second base and said third wings being parallel to said first wings.

9. The spool arrangement according to claim 8, wherein said third base comprises at least one recess on a peripheral side and the second base comprises at least one fastening opening wherein said recess at least partly overlaps the fastening opening.

10. The spool arrangement according to claim 7, wherein said second encapsulating member comprises at least one collar covering a space between encapsulating members.

11. The spool arrangement according to claim 1, wherein said protective walls are formed by wings and wherein at least one of said wings comprise stiffening means.

12. The spool arrangement according to claim 11, wherein one of said two parts comprises a base and wherein said stiffening means extend parallel to the base.

13. The spool arrangement according to claim 1, further comprising a wing comprising holding means, said holding means holding valve means.

14. The spool arrangement according to claim 2, wherein said coil surrounds an aperture in said spool housing, wherein bushing means made of metal are arranged within said aperture.

15. The spool arrangement according to claim 2, wherein at least one of said protective walls comprises a slot and said spool housing comprises at least one protrusion engaging in said slot.

16. The spool arrangement according to claim 3, wherein at least one of said protective walls comprises a slot and said spool housing comprises at least one protrusion engaging in said slot.

17. The spool arrangement according to claim 2, wherein said first part of said protection means is in form of a first U-shaped encapsulation member with a first base and two first wings connected to said first base and said second part is in form of a second U-shaped encapsulation member with a second base and two second wings connected to said second base, said first base and said second base being located on opposite sides of said spool housing and said first wings being arranged perpendicular to said second wings, and wherein said spool housing comprises a shaft extending through a base and engaging a protective member on a side of said base opposite said spool housing.

18. A spool arrangement comprising a spool member having a coil embedded in a spool housing made of plastic material and protection means comprising at least two parts together forming a receiving volume, said spool member being located in said receiving volume, wherein said parts form protective walls on all sides of said receiving volume, wherein said first part of said protection means is in form of a first U-shaped encapsulation member with a first base and two first wings connected to said first base and said second part is in form of a second U-shaped encapsulation member with a second base and two second wings connected to said second base, said first base and said second base being located on opposite sides of said spool housing and said first wings being arranged perpendicular to said second wings wherein said spool housing comprises a shaft extending through a base and engaging a protective member on a side of said base opposite said spool housing.

19. A spool arrangement comprising a spool member having a coil embedded in a spool housing made of plastic material and protection means comprising at least two parts together forming a receiving volume, said spool member being located in said receiving volume, wherein said parts form protective walls on all sides of said receiving volume, wherein said first part of said protection means is in form of a first U-shaped encapsulation member with a first base and two first wings connected to said first base and said second part is in form of a second U-shaped encapsulation member with a second base and two second wings connected to said second base, said first base and said second base being located on opposite sides of said spool housing and said first wings being arranged perpendicular to said second wings, and wherein said protection means comprise a third U-shaped encapsulation member having a third base and third wings connected to said third base, said third base being parallel to said second base and said third wings being parallel to said first wings.

\* \* \* \* \*